(12) United States Patent
Steiner et al.

(10) Patent No.: US 10,696,317 B2
(45) Date of Patent: Jun. 30, 2020

(54) PULL-DOWN UV SCREEN FOR CHILD CARRIERS

(71) Applicant: Steiner Innovations, Newport Beach, CA (US)

(72) Inventors: Richard Francis Steiner, Arroyo Grande, CA (US); Donald William Steiner, Newport Beach, CA (US)

(73) Assignee: Steiner Innovations, Newport Beach, CA (US)

(*) Notice: Subject to any disclaimer, the term of this patent is extended or adjusted under 35 U.S.C. 154(b) by 0 days.

(21) Appl. No.: 15/623,695

(22) Filed: Jun. 15, 2017

(65) Prior Publication Data
US 2018/0127014 A1    May 10, 2018

Related U.S. Application Data

(60) Provisional application No. 62/418,059, filed on Nov. 4, 2016.

(51) Int. Cl.
*B62B 9/14* (2006.01)
*E06B 9/42* (2006.01)
*E06B 9/60* (2006.01)

(52) U.S. Cl.
CPC ............ *B62B 9/145* (2013.01); *E06B 9/42* (2013.01); *E06B 9/60* (2013.01); *E06B 2009/425* (2013.01)

(58) Field of Classification Search
CPC . E06B 9/264; E06B 9/266; E06B 9/34; E06B 9/42; E06B 2009/425; E06B 9/54; E06B 9/60; E06B 9/46; E06B 9/48; B62B 9/145; A47H 1/13; E04F 10/0633; E04F 10/06

USPC .............. 160/24, 238, 323.1, 324, 326
See application file for complete search history.

(56) References Cited

U.S. PATENT DOCUMENTS

| | | | | |
|---|---|---|---|---|
| 1,180,124 A * | 4/1916 | Foedisch et al. | ......... | E06B 9/54 160/31 |
| 1,333,516 A * | 3/1920 | Thomsen | ................ | B60J 1/2013 160/274 |
| 1,621,972 A * | 3/1927 | Darby | .................... | B60J 1/2038 160/23.1 |
| 1,637,763 A * | 8/1927 | Clegg | .................... | B60J 1/2063 160/23.1 |
| 1,932,475 A * | 10/1933 | Peteler | .................. | B60J 1/2047 160/264 |
| 2,561,188 A * | 7/1951 | Ferguson | ................ | B60J 11/025 160/23.1 |
| 2,789,863 A * | 4/1957 | Shimabukuro | ......... | B62B 9/142 135/115 |

(Continued)

*Primary Examiner* — Daniel P Cahn
(74) *Attorney, Agent, or Firm* — Foundation Law Group LLP; J D Harriman

(57) ABSTRACT

The system provides a roller shade apparatus that can be affixed to any of a plurality of infant and toddler carriers (including strollers, playpens, car seats, rockers, and the like). A pair of adjustable clips allow for the roller shade to be mounted on carriers of a variety of widths. Once in place, the shade can be unrolled to the desired length and an adjustable cord with clamp (with Velcro™ backing pad) can be affixed to the body of the carrier to secure the shade in place. This allows the apparatus to be used in a variety of carriers with variable dimensions. The apparatus provides easy adjustment to various carrier designs with the use of ball joint swivels, spring clamps and an adjustable length cord.

5 Claims, 4 Drawing Sheets

(56) References Cited

U.S. PATENT DOCUMENTS

| | | | | |
|---|---|---|---|---|
| 4,762,358 A * | 8/1988 | Levosky | B60J 1/2063 | 160/323.1 |
| 4,858,990 A * | 8/1989 | Combs-Rose | A47C 7/66 | 135/96 |
| 5,024,479 A * | 6/1991 | Bryngelson | B60J 1/2063 | 16/443 |
| 5,036,898 A * | 8/1991 | Chen | B60J 1/2033 | 160/23.1 |
| 5,054,533 A * | 10/1991 | Lii | B60J 1/2033 | 160/23.1 |
| 5,098,149 A * | 3/1992 | Lee | B60J 1/2077 | 160/370.22 |
| 5,205,332 A * | 4/1993 | Lii | B60J 1/2033 | 160/23.1 |
| 5,226,467 A * | 7/1993 | Lii | B60J 1/2033 | 160/302 |
| 5,271,634 A * | 12/1993 | Walton | B62B 3/1436 | 160/23.1 |
| 5,330,251 A * | 7/1994 | McGuire | B60N 2/6027 | 160/370.22 |
| 5,362,119 A * | 11/1994 | Rosenratter | B60J 1/2063 | 160/DIG. 3 |
| 5,495,884 A * | 3/1996 | Shikler | B60J 1/2047 | 160/120 |
| 5,522,639 A * | 6/1996 | Jaime | B60N 2/28 | 297/183.3 |
| 5,758,889 A * | 6/1998 | Ledakis | B62B 9/14 | 280/47.38 |
| 5,921,609 A * | 7/1999 | Mills | B60J 5/0487 | 296/138 |
| 6,039,105 A * | 3/2000 | Patmore | B60R 5/047 | 160/121.1 |
| 6,155,628 A * | 12/2000 | Williams | B62B 9/142 | 280/47.38 |
| 6,173,725 B1 * | 1/2001 | Garth | A47C 7/66 | 135/117 |
| 6,217,099 B1 * | 4/2001 | McKinney | B62B 9/142 | 160/89 |
| 6,227,600 B1 * | 5/2001 | Chen | B60J 1/2047 | 296/97.2 |
| 6,330,898 B1 * | 12/2001 | Chang | B62B 9/145 | 160/24 |
| 6,382,720 B1 * | 5/2002 | Franklin | B60N 2/6027 | 297/221 |
| 6,503,188 B1 * | 1/2003 | August | A47C 21/00 | 160/238 |
| 6,659,551 B1 * | 12/2003 | Arenas | B60N 2/6027 | 160/23.1 |
| 6,715,526 B1 * | 4/2004 | Brownfield | A47H 13/00 | 160/24 |
| 7,082,981 B2 * | 8/2006 | Perez, Jr. | A01K 1/035 | 160/24 |
| 7,210,738 B1 * | 5/2007 | Mahaffy | B60N 2/60 | 297/184.1 |
| 7,503,336 B2 * | 3/2009 | Labarbera | A45B 25/18 | 135/16 |
| 7,530,543 B1 * | 5/2009 | Kremzar | A47B 97/02 | 160/24 |
| 7,997,601 B2 * | 8/2011 | Lin | B62J 15/00 | 160/242 |
| 8,424,138 B1 * | 4/2013 | Pinnell | B62B 3/1444 | 5/118 |
| 8,469,077 B1 * | 6/2013 | Allard | E04F 10/0603 | 160/24 |
| 8,875,775 B2 * | 11/2014 | Ross | B60J 1/2086 | 160/370.21 |
| 9,333,981 B2 * | 5/2016 | Roth | B62B 9/14 | |
| D761,592 S * | 7/2016 | Freese | D6/580 | |
| 9,969,418 B2 * | 5/2018 | Therrien | B62B 9/142 | |
| 2004/0016510 A1 * | 1/2004 | Vaughan | E06B 9/40 | 160/24 |
| 2005/0087308 A1 * | 4/2005 | Vaughan | E06B 9/40 | 160/24 |
| 2005/0098770 A1 * | 5/2005 | Schell | E01F 13/028 | 256/25 |
| 2005/0247414 A1 * | 11/2005 | Whittemore | E04G 21/24 | 160/351 |
| 2006/0053711 A1 * | 3/2006 | Vaughan | E06B 9/40 | 52/236.9 |
| 2008/0203757 A1 * | 8/2008 | Gilberg | B62B 9/145 | 296/100.16 |
| 2011/0088317 A1 * | 4/2011 | Goldberg | E06B 9/40 | 47/58.1 LS |
| 2012/0103541 A1 * | 5/2012 | Maxwell | E04F 11/1861 | 160/315 |
| 2013/0087177 A1 * | 4/2013 | Muinde | A45B 11/00 | 135/25.4 |
| 2014/0021751 A1 * | 1/2014 | Lang | A47D 15/00 | 297/184.13 |
| 2016/0324324 A1 * | 11/2016 | Wilkerson Altonen | E04H 15/40 | |
| 2017/0138125 A1 * | 5/2017 | Adib | E06B 9/42 | |
| 2017/0145739 A1 * | 5/2017 | Choi | E06B 9/264 | |

* cited by examiner

PULL-DOWN UV SCREEN FOR CHILD CARRIERS

This patent application claims priority to U.S. Provisional Patent Application 62/418,059 filed on Nov. 4, 2016, which is incorporated by reference herein in its entirety.

BACKGROUND OF THE SYSTEM

There has been inadequate UV eye and skin protection for children (e.g. infants and toddlers) who are too young to wear sun glasses, in carriers. Also, methods to protect the child's eyes and skin (i.e. blankets) have resulted in dangerous thermal conditions. Large UV film panels that cover a large part of the carrier have been marketed that are difficult to attach and store.

Current methods such as blankets to cover the child's eyes and skin provide poor ventilation and result in dangerous thermal conditions. Other apparatuses are difficult to attach, remove and store and require larger shipping and storage packages.

SUMMARY

The system provides a roller shade apparatus that can be affixed to any of a plurality of infant and toddler carriers (including strollers, playpens, car seats, rockers, and the like). A pair of adjustable clips allow for the roller shade to be mounted on carriers of a variety of widths. Once in place, the shade can be unrolled to the desired length and an adjustable cord with clamp (with Velcro™ backing pad) can be affixed to the body of the carrier to secure the shade in place. This allows the apparatus to be used in a variety of carriers with variable dimensions. The apparatus provides easy adjustment to various carrier designs with the use of ball joint swivels, spring clamps and an adjustable length cord.

DETAILED DESCRIPTION OF THE SYSTEM

The apparatus provides a pull-down UV eye and skin protection shade for use on infant and toddler carriers, including strollers, car seats, playpens, rockers, and the like. The apparatus uses a quick attach and release design mechanisms that can be used on different carrier dimensions and designs.

The apparatus comprises a spring roller mechanism that allows the extension and retraction of a UV protection material to a desired length. The roller mechanism includes adjustable fastening devices whose width can be adjusted to allow the roller mechanism to be attached to carriers of various dimensions. When extended, the UV protection material may be extend to a desired length and held in place by an adjustable fastening device that can attach to a portion of the carrier.

Figure 1:
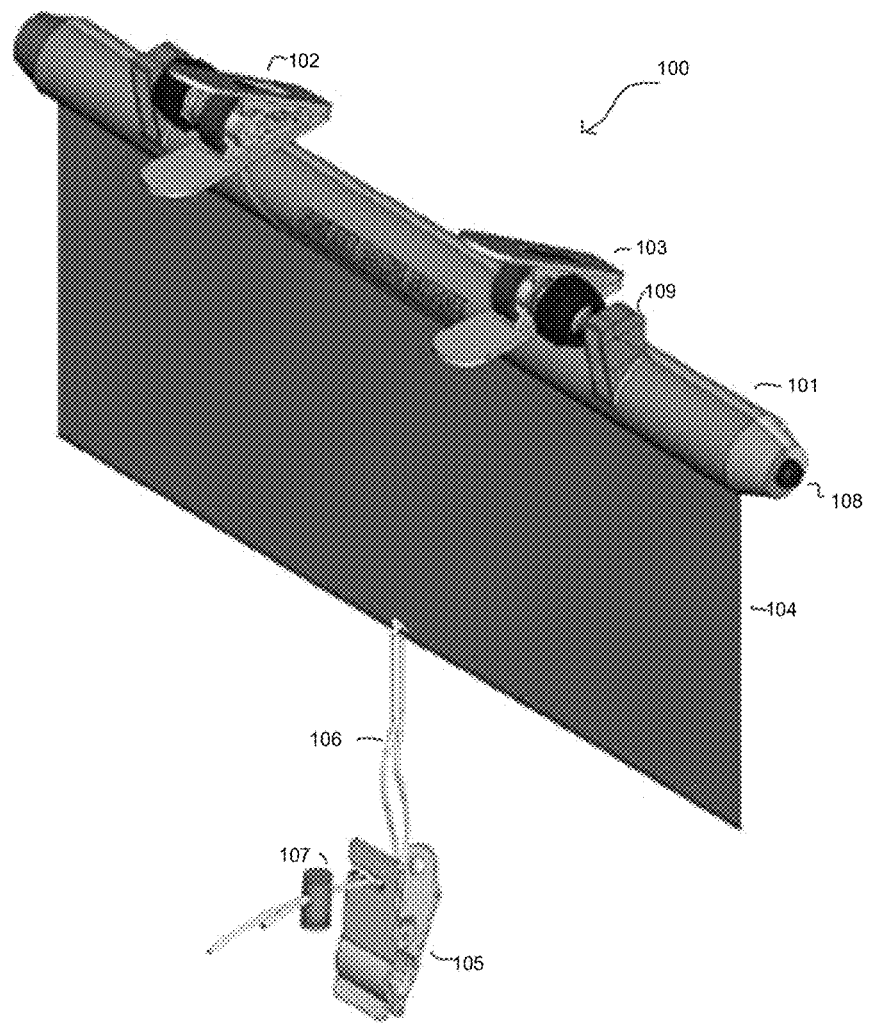
FIG. 1 is an example of an embodiment of the apparatus.

One embodiment of the apparatus is illustrated in FIG. 1. The apparatus 100 comprises roller mechanism 101 with first fasteners 102 and 103 for attaching the apparatus to a carrier (e.g. to the frame of the carrier or some other suitable location). The roller 101 stores an extendible UV shade 104. The shade 104 includes an adjustable fastener 105 that can be attached to the carrier to maintain the shade in a desire position and to prevent it from sagging onto the child.

In one embodiment, the fasteners 102 and 103 are spring type clips. The user can press the ends of the clips together to open the gripping portion wide enough to engage one or more points on a carrier. The spring clamp 102, 103 is then released, causing it to retain the apparatus to the carrier. In one embodiment the fasteners 102 and 103 are adjustable along the length of the roller mechanism 101 to adjust for different size and configurations of carriers. In addition, the fasteners 102 and 103 can rotate independently on a ball joint 109, providing additional flexibility in securing the assembly to a carrier.

The UV shade 104 includes a fastener 105 with Velcro™ backing pad attached to the shade via string or cord 106. The cord 106 may be a loop whose length may be adjusted by string grip 107. The fastener 105 may be a spring biased clamp similar to fasteners 102 and 103. The distance of the fastener 105 from the shade 104 can be adjusted so that various extensions of the shade may be accommodated while still providing support for the extended shade during use.

Referring now to UV shade 104, in one embodiment, the shade comprises a mesh that provides UV protection. For example, the shade can be comprised of a material referred to as sun shade screen mesh. The mesh can have a shade rate of 30-95% depending on the mesh size. For example, using a polyethylene material with a mesh size of 0.7 mm by 0.7 mm can provide 95% shade rate. A UV shade 104 comprised of mesh permits air flow to the child while still providing desire UV protection.

In another embodiment, the UV shade 104 may be comprised of a tinted plastic film that provides UV protection. The UV film may be flexible so that it can be rolled and unrolled in the roller mechanism 101. A variety of films of various thicknesses and shade rates may be utilized in the apparatus without departing from the scope and spirit of the system.

In one embodiment, the roller mechanism 101 is configured so that the shade can be extended in half inch increments and held in place, similar to a roller blind. The shade may be retracted by activation of button 108 which causes the spring biased shade 104 to retract into the mechanism 101. In one embodiment, the shade can extend 24 inches. However, other lengths can be accommodated in the present system. The width of the shade may be 14 inches in one embodiment and the width of the roller mechanism 101 may be 17-18 inches. However, these dimensions are for purposes of example and the apparatus may be of other dimensions.

Figure 2:
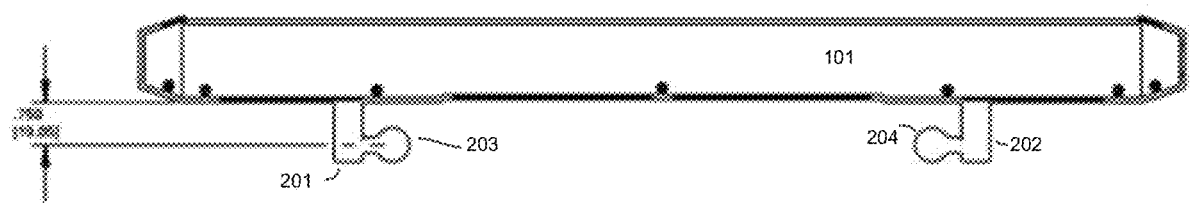
FIG. 2 is an example of a roller mechanism in an embodiment of the system.

FIG. 2 is a side view of the roller mechanism 101 showing ball joints attached to receive the clips 102 and 103. The ball joints 203 and 204 are disposed on raised members 201 and 202 that provide distance from the roller mechanism 101 and to allow movement of the fasteners 102 and 103 when attached to the ball joints.

Figure 3:
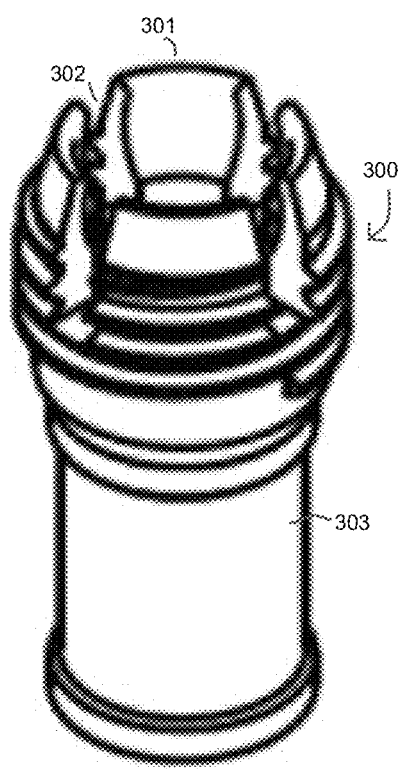
FIG. 3 illustrates a hub in an embodiment of the system.

FIG. 3 illustrates an embodiment of a hub socket 300 that can be removably coupled to the ball joints 202 or 204. The hub socket 300 includes a split head 301 with spaces 302 that allows the head 301 to expand somewhat to be attached to the ball joint 202. After the edge of the head 301 goes over the widest part of the ball joint 202, the head 301 regains its smaller shape, effectively gripping the ball joint and retaining the hub socket on the ball joint, while allowing rotational and pivoting motion about the ball joint as desired.

The hub 300 includes a shaft 303 that receives a clip 102 or 103. The clip 102 or 103 is thus coupled to the ball joint and its orientation may be changed so that the clip 102 or 103 can be positioned to attach to any of a variety of carriers. The grip of the hub 300 is such that movement is permitted, but enough friction is provided between the hub 300 and ball joint 202 to retain its position and direction.

The apparatus provides a fast attach/remove UV protection shade for infant and toddler carriers with variable adjustment of the UV shade area by using a spring aided pull-down screen.

Figure 4:
FIG. 4 illustrates the apparatus attached to a stroller.

FIG. 4 illustrates an embodiment of the apparatus 100 attached to a stroller 400. The stroller includes a canopy with a frame 401 that defines the shape of the canopy and acts somewhat as a shade device on the stroller. However, the canopy does not provide adequate UV eye and skin protection of a child in the stroller. The apparatus 100 may be attached to the frame 401 using clips 102 and 013 which can open and grab the frame 401. The shade 104 can be pulled from the roller 101 and attached to a bottom frame member 402 using clip 105. This allows the shade apparatus to stay in place and provide additional eye and skin protection for a child in the stroller 400.

Figure 5:
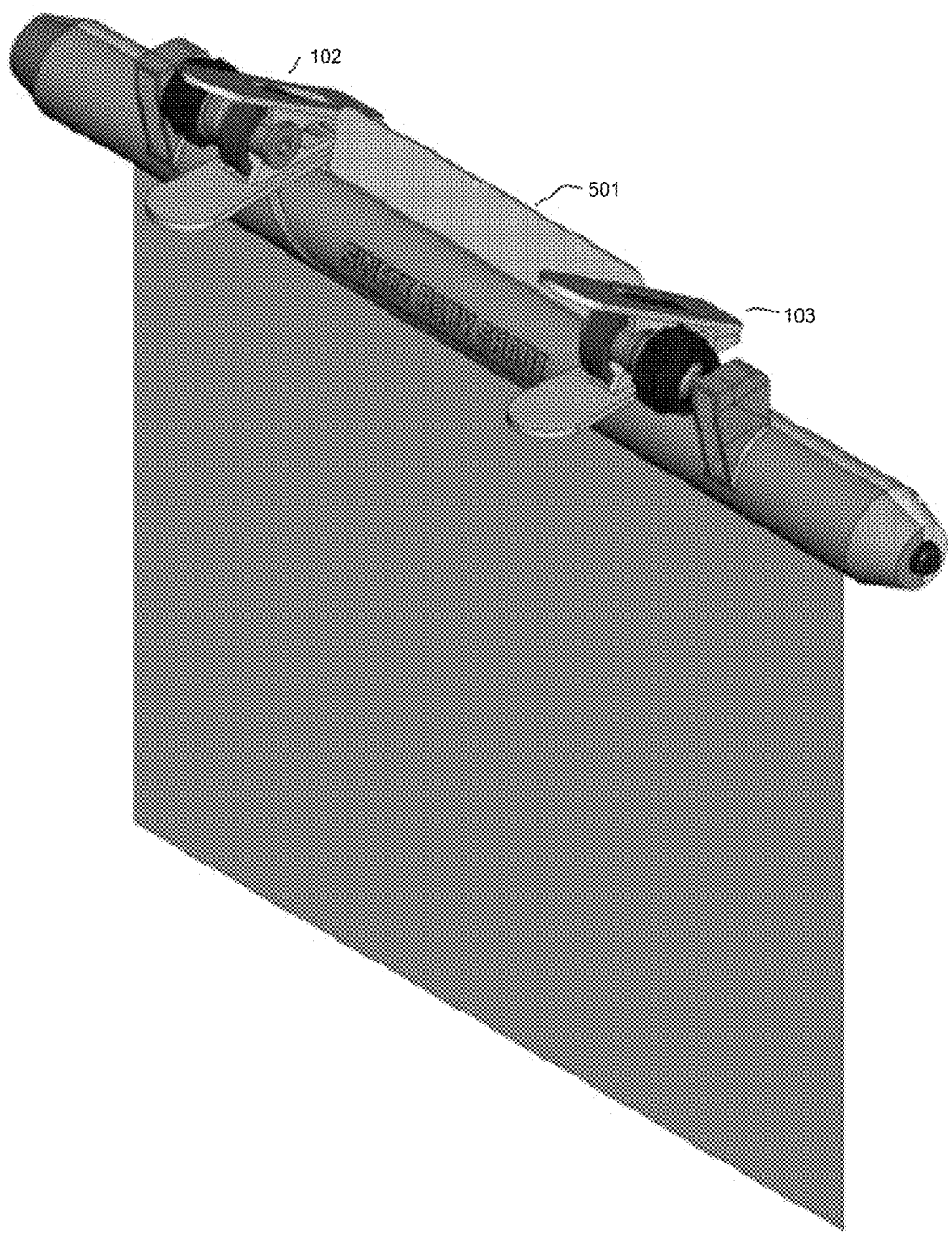
FIG. 5 illustrates an alternate embodiment of the system.

FIG. 5 is an alternate embodiment of the apparatus. In this embodiment, the apparatus is similar to the embodiment of FIG. 1, with the addition of an additional vertical member 501 that is disposed between clips 102 and 103. This member 501 provides additional shade and protection in the area of a frame or canopy that may have an opening into the interior of a stroller.

Thus an adjustable pull down UV shade that may be attached to a variety of child carriers has been described.

What is claimed is:

1. An apparatus comprising:
    a spring mechanism comprising a shade material configured to retract into the spring mechanism;
    first and second fasteners coupled to the spring mechanism, wherein each of the first and second fasteners is configured to be rotationally and pivotally adjusted and moved to a plurality of positions, and the first and second fasteners are removably coupled directly to a canopy frame of a child carrier, the first fastener has a first spring clamp coupled to a first ball joint attached to the spring mechanism, the second fastener has a second spring clamp coupled to a second ball joint attached to the spring mechanism, wherein each of the spring clamps are adjustably positioned at locations along a major length of the spring mechanism via inward and outward rotation of the spring clamps about the ball joints;
    a third fastener coupled to the shade material, wherein the third fastener is adjustable such that the shade material is configured to be positioned and held at one or more of a plurality of lengths to cover an infant in the child-carrier; and
    wherein the shade material provides UV protection for the infant in the child-carrier.

2. The apparatus of claim 1 wherein the shade material comprises a mesh material.

3. The apparatus of claim 1 wherein the shade material comprises a film.

4. The apparatus of claim 1 further including an actuator to retract the shade material into the spring mechanism and wherein the shade material is configured to be extended to two or more of a plurality of increments.

5. The apparatus of claim 1 further including a vertical member coupled to the spring mechanism and disposed at an area between the first and second fasteners to block light from passing through that area.

* * * * *